No. 695,378. Patented Mar. 11, 1902.
W. B. COWLES.
CHECK VALVE.
(Application filed July 3, 1901.)
(No Model.)

Witnesses
Percy C. Bowen.
Fred W. Englert.

Inventor
W. B. Cowles,
by Wilkinson & Fisher,
Attorneys.

THE NORRIS PETERS CO., PHOTO-LITHO., WASHINGTON, D. C.

UNITED STATES PATENT OFFICE.

WILLIAM BARNUM COWLES, OF CLEVELAND, OHIO, ASSIGNOR TO THE LONG ARM SYSTEM COMPANY, OF CLEVELAND, OHIO, A CORPORATION OF WEST VIRGINIA.

CHECK-VALVE.

SPECIFICATION forming part of Letters Patent No. 695,378, dated March 11, 1902.

Application filed July 3, 1901. Serial No. 67,019. (No model.)

*To all whom it may concern:*

Be it known that I, WILLIAM BARNUM COWLES, a citizen of the United States, residing at Cleveland, in the county of Cuyahoga and State of Ohio, have invented certain new and useful Improvements in Check-Valves; and I do hereby declare the following to be a full, clear, and exact description of the invention, such as will enable others skilled in the art to which it appertains to make and use the same.

My invention relates to improvements in check-valves, and especially to check-valves intended to control fluids under high pressure, where the tendency to leak around the packing of the check-valve is augmented by the increased pressure.

My invention consists in the substituting of a flexible diaphragm between the stem of the valve and the holding-down stem or screw in such manner as to avoid all necessity for packing, thus eliminating possible leaks in the pipe-line holding fluid under high pressure.

My invention will be understood by reference to the accompanying drawings, in which the same parts are indicated by the same letters throughout the several views.

Figure 1:
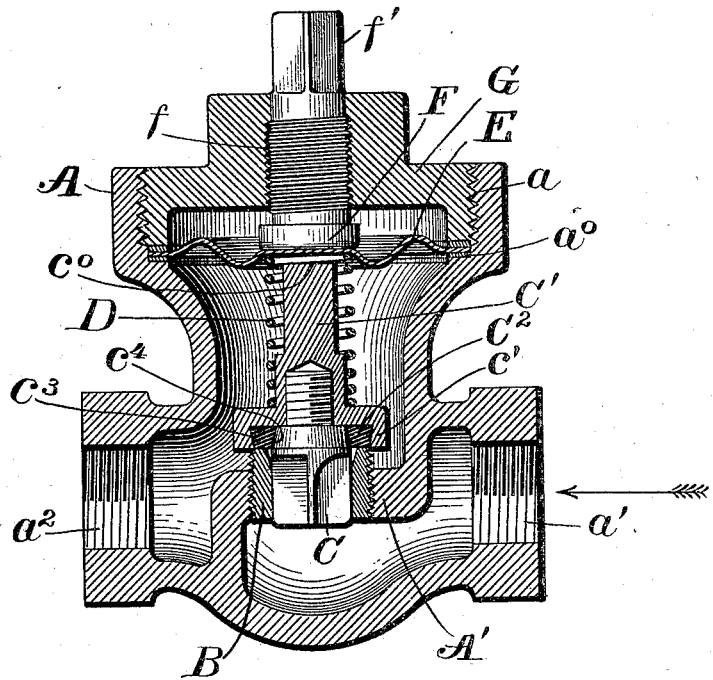
Figure 2:
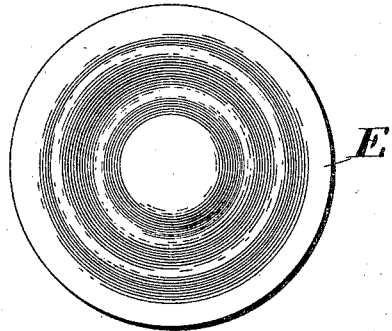
Figure 3:
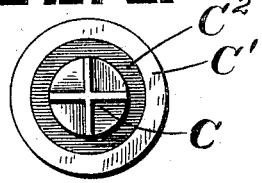

Figure 1 represents a central vertical section through the valve-casing and shows parts of the valve mechanism in section. Fig. 2 is a plan view of the diaphragm shown in Fig. 1, and Fig. 3 is an inverted plan view of the valve and valve-stem shown in Fig. 1.

A represents the valve-casing, having an inlet $a'$ and an outlet $a^2$ for the fluid under pressure. This valve-casing is divided into two chambers by means of the web A', into which web is screwed the cylindrical valve-seat B, through which passes the check-valve tail C, which is made cruciform or of other suitable shape to permit the flow of the fluid thereby when the valve is lifted. This valve-tail is screwed into the valve-stem C', which has a cup-shaped base $c'$, into which an annular washer $C^2$, of leather, rubber, or other suitable material, is inserted. This washer is preferably held between the taper face $c^4$ of the valve-tail C and the undercut face $c^3$ of the valve-stem, and thus is dovetailed in and held securely in place. The valve-stem is surrounded by the coil-spring D, which tends to press the valve downward on its seat. The weight of the valve alone would ordinarily be sufficient for this purpose; but the positive action of the spring is desirable to supplement the weight of the valve in case there should be a tendency of any of the parts to stick. This spring also enables the valve to work properly as a check-valve in any position.

The diaphragm E is normally clear of the top end $c^0$ of the valve-stem C'; but when the screw F is screwed down it will hold down the valve-stem and lock the valve on its seat, thus preventing the passage of any fluid past the valve. The diaphragm E is preferably clamped between the screw-cover G and the shoulder $a^0$ of the casing A. Suitable gaskets may be used, if desired, to make a tight joint. This screw-cover G is screwed into the casing A, as at $a$, and it is screw-threaded to receive the holding-down screw F, which is screw-threaded at $f$ and is provided with a square end $f'$ for the handle, wrench, or other device for turning the screw. Thus it will be seen that the diaphragm E furnishes an absolutely tight packing for the holding-down screw and that end of the valve-chamber and at the same time renders it possible to have easy access to the contents of the valve-chamber. Thus the screw-cover G may be removed, the diaphragm taken out, and the valve and valve-stem may be removed for cleaning or repairs.

Having thus described my invention, what I claim, and desire to secure by Letters Patent of the United States, is—

1. In a valve mechanism, the combination with a valve-casing and a cover secured thereon, of a diaphragm held between said cover and said valve-casing, an adjustable stop screwed into said cover and bearing against said diaphragm, and a check-valve having a stem normally clear of said diaphragm but adapted to be engaged thereby when said stop is screwed down, substantially as described.

2. In a valve mechanism, the combination with a closed valve-casing and a flexible diaphragm mounted therein, of a check-valve mounted in said casing beneath said diaphragm, a spring interposed between said check-valve and said diaphragm, and an adjustable stop mounted in said casing and bearing against said diaphragm, substantially as described.

3. A check-valve mechanism, comprising a closed casing, a flexible diaphragm mounted therein, a check-valve mounted in said casing at one side of said diaphragm, a spring interposed between said check-valve and said diaphragm, and an adjustable stop projecting into said casing and bearing against the other side of said diaphragm, substantially as and for the purposes described.

4. In a valve mechanism, the combination with a valve-casing and a cover secured thereon, of a flexible diaphragm held between said cover and said casing, a check-valve mounted in said casing beneath said diaphragm, a spring interposed between said check-valve and said diaphragm, and an adjustable stop mounted in said cover and adapted to bear against said diaphragm, substantially as described.

5. In a valve mechanism, the combination with a valve-casing and a cover mounted thereon, of a diaphragm held between said cover and said valve-casing, an adjustable stop screwed into said cover and bearing against said diaphragm, a check-valve having a stem normally clear of said diaphragm but adapted to be engaged thereby when said stop is screwed down, and a coil-spring inclosing said valve-stem and interposed between said check-valve and said diaphragm, substantially as described.

In testimony whereof I affix my signature in presence of two witnesses.

WILLIAM BARNUM COWLES.

Witnesses:
FREDERIC C. HOWE,
FRED F. WILKISON.